(12) United States Patent
Rasmussen et al.

(10) Patent No.: US 6,597,473 B1
(45) Date of Patent: Jul. 22, 2003

(54) METHOD TO OBTAIN CONSISTENT IMAGE QUALITY MEASUREMENTS FROM DIFFERENT IMAGE INPUT DEVICES

(75) Inventors: D. Rene Rasmussen, Pittsford, NY (US); Edul N. Dalal, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,183

(22) Filed: Nov. 29, 1999

(51) Int. Cl.$^7$ .............................................. G06F 15/00
(52) U.S. Cl. ...................... 358/1.9; 358/500; 358/501; 358/518; 382/112; 382/167; 382/287
(58) Field of Search ................................ 358/500, 501, 358/518, 522, 1.9, 1.15, 406; 382/181, 112, 167, 287

(56) References Cited

U.S. PATENT DOCUMENTS

| | | | |
|---|---|---|---|
| 4,071,911 A | * 1/1978 | Mazur | 700/1 |
| 4,086,434 A | * 4/1978 | Bocchi | 379/91.01 |
| 4,583,834 A | * 4/1986 | Seko et al. | 399/8 |
| 4,780,761 A | * 10/1988 | Daly et al. | 375/240.2 |
| 4,920,501 A | * 4/1990 | Sullivan et al. | 358/3.19 |
| 5,038,319 A | * 8/1991 | Carter et al. | 714/2 |
| 5,057,866 A | * 10/1991 | Hill et al. | 399/8 |
| 5,084,875 A | * 1/1992 | Weinberger et al. | 714/46 |

(List continued on next page.)

FOREIGN PATENT DOCUMENTS

EP  0 854 632 A2 * 7/1998

OTHER PUBLICATIONS

Remote Diagnostic Systems, Paul F. Morgan, Xerox Disclosure Journal, vol. 3, No. 3, May/Jun. 1978, pp. 191–192x.*

Event–based architecture for real–time fault disgnosis, real–time fault Monitoring of Industrial processes, A.D. Pouliezos & G.S. Staverakakis, Kluwer academic Publishers, 1994, pp. 284–287.*

Failt Diagonstis in Dynamic Ststems Using Analytical and Knowledge–based Redundancy—A Survey and Some New Results, Paul M. Frank, Automatica, vol. 26, 90 International Federation of Automatic Control, 1990, pp. 459–474.*

Combining Expert System and Analytic Redundancy Concepts for fault–Toleram=nt Flight Control, David A. Handelman and Robert F. Stengel, Princeton University, J. Guidance, vol. 12, No. 1, Jan.–Feb. 1989, pp. 39–45.*

*Primary Examiner*—Edward Coles
*Assistant Examiner*—Tia A Carter
(74) *Attorney, Agent, or Firm*—Oliff & Berridge, PLC

(57) ABSTRACT

An image quality analysis system is provided for image output devices, such as printers and copiers, that overcomes problems with differences in analysis results caused by use of different image input devices. This is achieved by computing a differential transfer function that makes subsequent analysis device independent. Moreover, the analysis is performed on an image that has been blurred to also reflect absolute image quality metrics as seen by a human observer. By determining the resolving characteristics of the input scanner, the scanned image can be processed, with little or no artifacts, to resemble the image as perceived by a human observer, while at the same time eliminating differences that would arise when using a scanner having a different spatial resolving power.

19 Claims, 7 Drawing Sheets

U.S. PATENT DOCUMENTS

| | | | | |
|---|---|---|---|---|
| 5,365,310 A | * | 11/1994 | Jenkins et al. | 399/8 |
| 5,510,876 A | * | 4/1996 | Hayashi et al. | 399/1 |
| 5,510,896 A | * | 4/1996 | Wafler | 358/296 |
| 5,612,902 A | * | 3/1997 | Stokes | 702/85 |
| 5,619,307 A | * | 4/1997 | Machino et al. | 399/11 |
| 5,642,202 A | * | 6/1997 | Williams et al. | 358/406 |
| 5,680,541 A | * | 10/1997 | Kurosu et al. | 714/26 |
| 5,694,528 A | * | 12/1997 | Hube | 358/1.14 |
| 5,696,850 A | * | 12/1997 | Parulski et al. | 382/261 |
| 5,748,221 A | * | 5/1998 | Castelli et al. | 347/232 |
| 5,754,311 A | * | 5/1998 | Ray | 358/3.14 |
| 5,884,118 A | * | 3/1999 | Mestha et al. | 399/15 |
| 5,933,254 A | * | 8/1999 | Webb et al. | 358/500 |
| 5,995,248 A | * | 11/1999 | Katori et al. | 358/2.1 |
| 6,023,525 A | * | 2/2000 | Cass | 382/162 |
| 6,023,595 A | * | 2/2000 | Suzuki et al. | 399/31 |
| 6,275,600 B1 | * | 8/2001 | Banker et al. | 382/112 |
| 6,281,992 B1 | * | 8/2001 | Kondo | 358/501 |
| 6,345,130 B1 | * | 2/2002 | Dahl | 382/286 |
| 6,421,468 B1 | * | 7/2002 | Ratnakar et al. | 382/254 |

* cited by examiner

METHOD TO OBTAIN CONSISTENT IMAGE QUALITY MEASUREMENTS FROM DIFFERENT IMAGE INPUT DEVICES

BACKGROUND OF THE INVENTION

1. Field of Invention

This invention relates to an image quality analysis system that obtains consistent image quality measurements regardless of the particular image input device used.

2. Description of Related Art

It is well known that customer satisfaction can be improved and maintenance costs reduced if problems with copiers and printers can be fixed before they become serious enough to warrant a service call by the customer. While current technology exists to enable printers and copiers to call for service automatically when sensors detect certain operating parameters outside of permissible ranges, there is not a very comprehensive manner of detecting incipient system failure or automatically diagnosing when problems with image quality reach a level where human observers perceive a reduction in quality. This is caused not only by the large number of operating parameters that would need to be tracked, but also because these parameters are strongly coupled to one another. That is, a given parameter at a certain value may or may not be a problem depending on the values of other parameters. While existing systems provide some level of image quality analysis, these systems have been found less than satisfactory as image quality determination is machine dependent and may be inconsistent with perceptions of image quality as judged by human users.

SUMMARY OF THE INVENTION

Systems which can perform image analysis on printed test samples can be used in a variety of ways to provide solutions and value to users of digital printers and copiers, for example as the analysis engine for automatic or remote diagnosis of print quality problems, or for monitoring quality as part of a print quality assurance system.

The system would typically use an input scanner, either stand-alone or part of a multi-function printer/scanner/copier, to scan the printed test sample, and then perform a series of analyses on the scanned image. Alternatively, a CCD camera could be used in place of the scanner. It is important to have consistent behavior of such systems, when used with different input scanners. That is, the results of the analysis from one input scanner should be essentially identical to results from other input scanners. Only if this is the case, can the IQ measurements from one such system be compared with other systems. In the case where the system is used by the printer/copier user, for example for IQ assurance purposes, it is imperative that the results be consistent in order to compare with industry standard measurements.

However, the input scanner is likely to be part of a multi-function printer/scanner/copier, and each system would therefore use a scanner with different characteristics, especially in terms of spatial resolving power.

This invention overcomes problems with differences in analysis results caused by use of different image input devices by providing a computational process that allows absolute image quality measurements to be performed consistently from scans of print samples, largely independent of the resolving power of the scanner. Absolute image quality metrics reflect quality as seen by a human observer. By determining the resolving characteristics of the input scanner, the scanned image can be processed, with little or no artifacts, to resemble the image as perceived by a human observer, while at the same time eliminating differences that would arise when using a scanner having a different spatial resolving power, provided that the resolving power of each scanner is sufficiently greater than the resolving power of the human visual system.

BRIEF DESCRIPTION OF THE DRAWINGS

The invention will be described with reference to the following illustrative drawings, wherein like numerals refer to like elements and wherein.

DETAILED DESCRIPTION OF PREFERRED EMBODIMENTS

Figure 1:
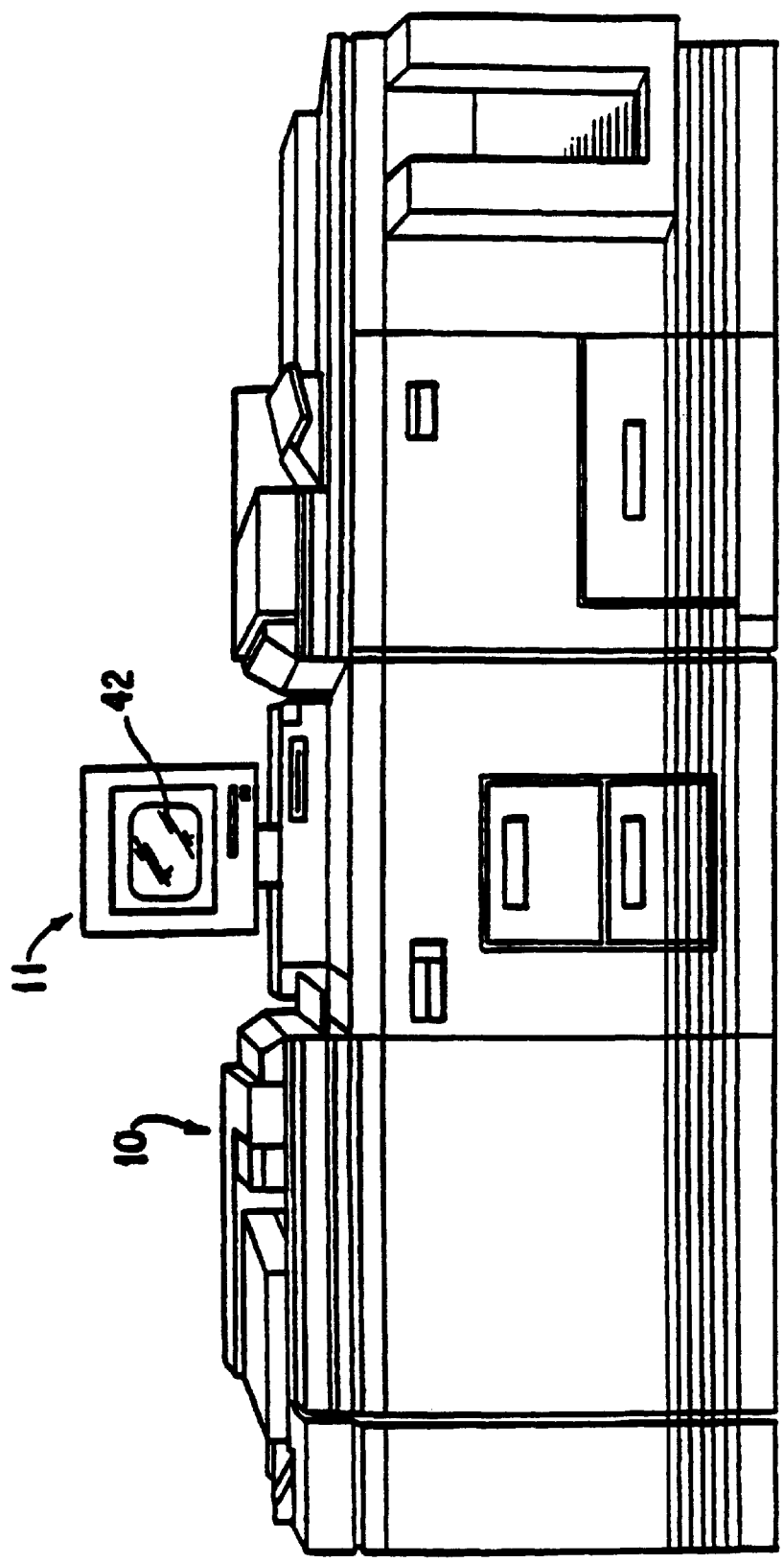
FIG. 1 shows a typical digital copier machine having a user interface suitable for use with the invention.

An exemplary device to which automatic image quality analysis is to be performed will be described with reference to FIGS. 1–3. FIG. 1 shows an image output device, in particular a digital copier machine 10, comprising a plurality of programmable components and subsystems which cooperate to carry out copying or printing jobs programmed through a touch dialog screen 42 of a user interface (UI) 11. Internal operating systems of the digital copier 10 are disclosed in U.S. Pat. Nos. 5,038,319, 5,057,866, and 5,365,310, owned by the assignee of the present invention, the disclosures of which are incorporated herein by reference in their entirety. As such, no further detailed description thereof is necessary. Digital copier 10, however, is merely representative of a preferred printing system to which the image quality determination is made. It should be understood that a loosely coupled printing or reproducing system is also applicable for use with the invention described herein, such as a printer or facsimile device. Moreover, while there may be benefits to use of the image quality analysis on a reproduction system, such as a digital copier having an integral scanner component, the invention also is applicable to a printer used in conjunction with a stand-alone scanner, such as a flatbed type scanner.

Figure 2:
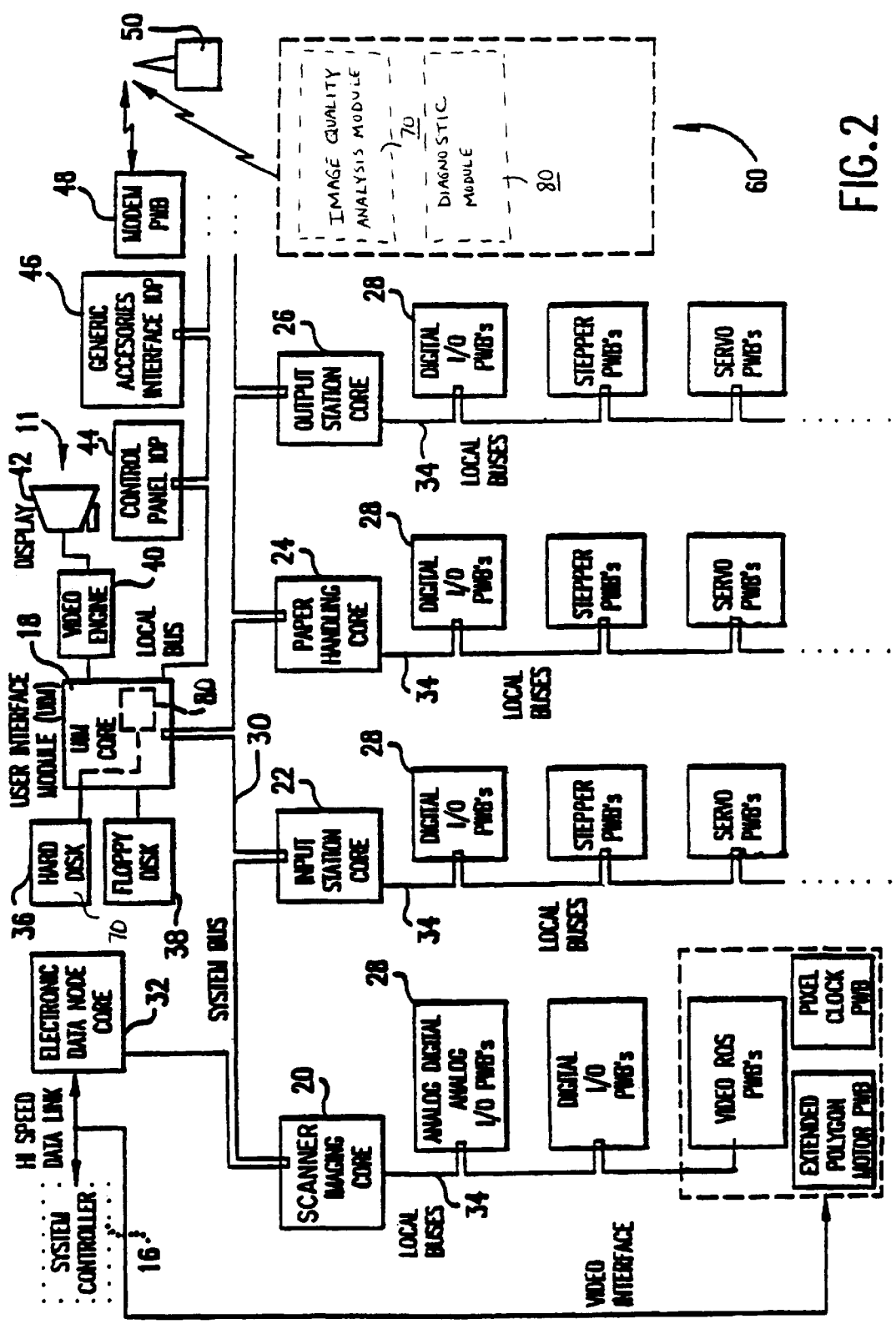
FIG. 2 is a schematic diagram of a digital copier having a user interface for communicating with a remote diagnostic computer.

Referring to FIG. 2, operation of the various components of exemplary digital copier 10 is regulated by a control system which uses operating software stored in memory in the system controller 16 to operate the various machine components in an integrated fashion to produce copies and prints. The control system includes a plurality of printed wiring boards (PWBs), there being a user interface module (UIM) core PWB 18, a scanner/imaging core PWB 20, an input station core PWB 22, a paper handling core PWB 24 and an output station core PWB 26, together with various input/output (I/O) PWBs 28. A shared line (SL) 30 couples the core PWBs 18, 20, 22, 24 and 26 with each other and with the electronic data node core 32, while local buses 34 serve to couple the PWBs to the respective cores and to stepper and servo PWBs. Programming and operating control over digital copier 10 is accomplished through touch dialog screen 42 of UI 11. The operating software includes application software for implementing and coordinating operation of system components.

Floppy disk port 38 provides program loading access to UIM core PWB 18 for the purpose of entering changes to the operating software, loading specific programs, such as diagnostic programs, and retrieving stored data, such as machine history data and fault data, using floppy disks. Hard disk 36 is used as a non-volatile memory (NVM) to store programs, machine physical data and specific machine identity information. One of the programs hard disk 36 may store is image quality analysis software that forms an image quality analysis module 70 used by the invention. Module 70 may also reside on a floppy disk used in floppy disk port 38.

UIM core PWB 18 communicates with video engine 40 for driving a suitable visual display 42, such as a CRT or flat screen of the user interface 11. The UIM core 18 also has connected thereto a control panel I/O processor 44 and a generic accessories interface I/O processor 46. The interface I/O processor 46 is in turn connected to a modem PWB 48. The modem 48 provides communication between digital copier 10 and a communications channel, such as a public switched telephone network 50 to facilitate information transfer to and from a remote diagnostic computer 60, which may also include image quality analysis module 70 as well as other diagnostic modules.

The information from the subsystem cores flows to and from the UIM core PWB 18, which embodies software control systems including a user interface system manager and a user interface manager. The UI system manager includes a UI display manager subsystem for controlling the display of messages on the display 42. A data manager subsystem provides data management to the UI system manager.

Figure 3:
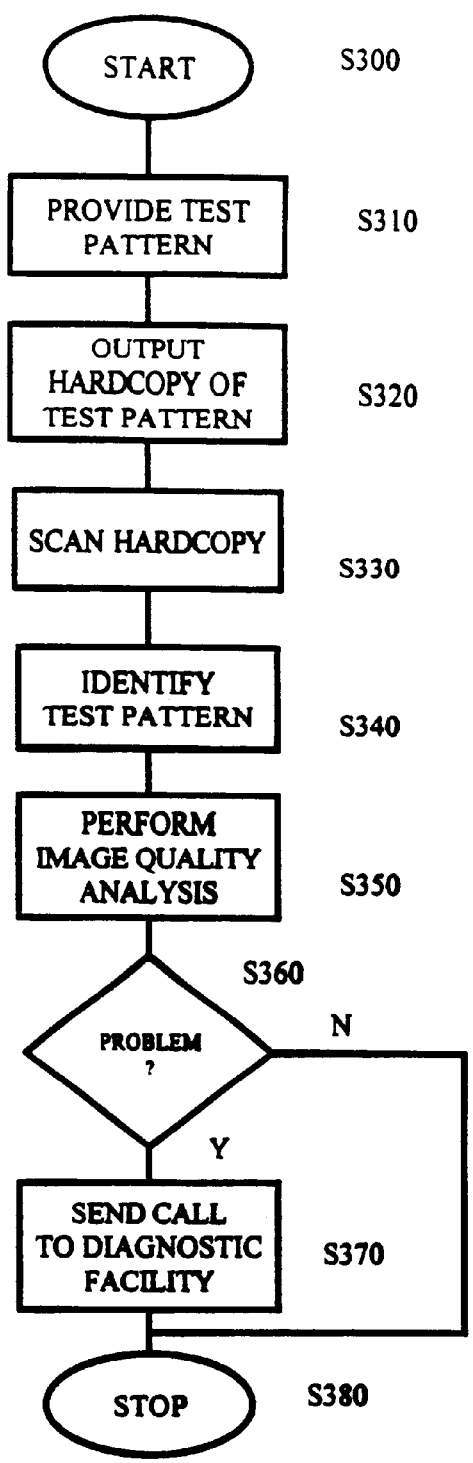
FIG. 3 is a flow chart showing an image analysis method according to the invention.

In a first embodiment of the invention, image quality analysis is performed by the process set forth in the flow chart of FIG. 3. The process starts at step S300 and advances to step S310 where at least one specific digital test pattern, which can either be in hardcopy original form or a digital image stored in memory 36, is provided. Preferably, multiple different test patterns are used to analyze various components relevant to a determination of image quality. Flow then proceeds to step S320 where a corresponding hardcopy output of the test pattern is generated. This can be by outputting a printed hardcopy output from output station 26 using the digital test pattern as an input when the test pattern is stored in digital form, such as in hard disk 36 or floppy disk 38. Alternatively, an accurate original hardcopy test pattern may be placed at scanner 20 and scanned into the digital copier 10 to form a digital test pattern, which can be used as an input to output station 26 to form the hardcopy output. Then, flow advances to step S330 where the hardcopy output is scanned by scanner 20 to form a digital raster image for analysis purposes.

After step S330, flow advances to step S340 where the digital image is preferably acted on by pattern recognition software, which can be located within hard disk 36 or floppy disk 38 and is associated with image quality analysis module 70, to determine a precise location of various test elements within the scanned digital raster image. This software uses a Hough or similar transform to automatically detect locator marks on the image. A suitable pattern recognition system for use with the invention can be found in U.S. Pat. No. 5,642,202 to Williams et al., owned by the assignee of the present invention, the disclosure of which is incorporated herein by reference in its entirety. Alternatively, or in conjunction therewith, the test pattern may include a script that signifies a particular test pattern. The copier machine 10 may hardware/software to decipher the particular script embedded into the test pattern. The memory of the copier 10 may be provided with a file corresponding to each possible script detailing the contents of the script and associated test pattern, as well as detailing the particular image quality analysis routine to be used to measure a particular part of overall image quality. A more detailed description of such a scripted test pattern can be found in co-pending U.S. Ser. No. 09/450,182 to Rasmussen et al., filed concurrently herewith, entitled "Method to Allow Automated Image Quality Analysis of Arbitrary Test Patterns", the subject matter of which is incorporated by reference herein in its entirety.

After step S340, the process flows to step S350 where image quality analysis is performed on the test image using image quality analysis module 70. From step S350, flow advances to step S360 where a determination is made by the image quality analysis module 70 whether the image quality for this particular test image is acceptable. If it is, flow advances to step S380 where the process stops. However, if the image quality is not acceptable, flow advances from step S360 to step S370 where a call can be made to a diagnostic facility. This call may be an automatic service call made through modem 48 for scheduling an actual service visit by a service technician to correct the noted problems. Alternatively, it may be a call to a more sophisticated diagnostic module 80 located locally or at the remote facility that can further analyze the image quality problem along with values from various sensors and settings on the copier 10. This would provide corrective feedback to the digital copier 10, such as through modem 48 when module 80 is remotely located, allowing the digital copier 20 to adjust itself within acceptable parameters.

Figure 4:
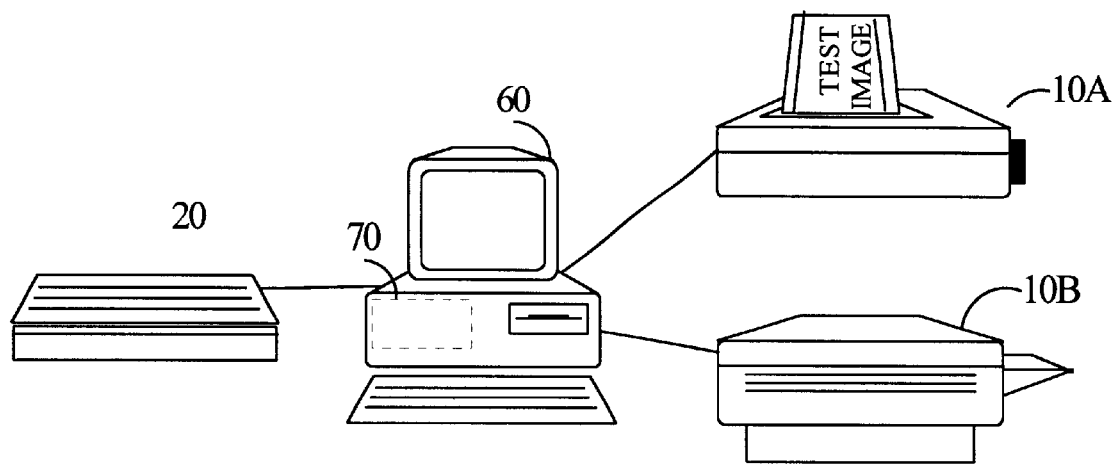
FIG. 4 is an alternative image output device and image analysis system according to the invention.

Alternatively, the image quality analysis module 70 may be remote from image output device 10. An example of which is illustrated in FIG. 4 where image output devices are in the form of printers 10A, 10B which are associated with a personal computer 60 through appropriate data cables. A flat bed scanner 20 is also associated with personal computer 60 and image quality analysis module 70 is in the form of software provided in personal computer 60. This embodiment operates as the previous embodiment in that the printers 10A, 10B (which ever is being tested) are given a test pattern to generate a hardcopy output from. This hardcopy output is then placed in scanner 20 to generate the digital test image. This digital test pattern is then analyzed to determine image quality of the printer. In the case where the image quality analysis system is used not for machine diagnosis, but for example for quality assurance, the results from step S350 would be provided to the user of the system.

While shown in FIG. 4 to be loosely associated, the invention can also be practiced with completely discrete components, such as a separate printer, scanner and computer or other source for containing image quality analysis module 70. In this case, the hardcopy output from the printer can be provided to a non-associated scanner for scanning. Then, the digital test image from the scanner can be stored or converted onto a portable recording medium, such as a floppy disk and provided to a non-associated computer having the image quality analysis module.

The test pattern used can be one of several test patterns designed to provide evaluation of one or more parameters relevant to image quality analysis of the output of the printing system, such as color registration, motion quality, micro and macro uniformity, color correction, and font quality. This overall analysis is typically performed using human visual perception models so that only those differences that would be perceived by a human observer are determined. That is, rather than having the analysis merely compare a scanned image to an original or to determine some level of variation or deviation from a given norm that may or may not rise to the level of a perceived image quality issue when viewed by a human observer, the image quality analysis utilizes models of human visual perception. At a simple level, this can be achieved by passing the image through a band-pass filter known to be similar in resolution to that achieved by a human vision system. More sophisticated modeling can also be used.

This particular invention relates specifically to providing consistent image quality analysis of an image output device, such as a printer or copier, regardless of the analysis equipment used. For a more detailed description of the overall image quality analysis system, see co-pending U.S. Ser. No. 09/450,185 to Rasmussen et al., filed concurrently herewith, entitled "Virtual Tech Rep By Remote Image Quality Analysis", the disclosure of which is incorporated herein by reference in its entirety.

The ability of a scanner to resolve fine details in an image can be characterized in terms of its sensitivity at different spatial frequencies. This is usually referred to as the scanner's MTF (modulation transfer function).

For many applications it is necessary that image quality (IQ) metrics directly reflect quality as seen by a human observer. The human visual system (HVS), operating at normal viewing distances of 30 cm or more, typically has worse resolving power than image input devices such as flatbed scanners. Therefore, analysis of scanned images can falsely identify print quality problems. Standard image quality metrics for graininess, for example, take into account the sensitivity of the HVS at different spatial frequencies. The sensitivity of the HVS at different spatial frequencies is expressed through a so-called Visual Transfer Function (VTF), which is the human equivalent of the MTF of a scanner.

The ratio between the human VTF and the scanner MTF expresses, at each spatial frequency, the extent to which the human visual system is less sensitive than the scanner. We call this the differential transfer function (DTF).

Image quality metric that quantify quality as perceived by a human observer, typically start with a scan of a printed test sample, and then utilize a sequence of image processing steps, one or more of which correspond to human visual processing as described by human visual models. For an example of such processing see co-pending U.S. Ser. No. 09/450,180 to Rasmussen et al., filed concurrently herewith, entitled "Image Processing Algorithm For Characterization of Uniformity of Printed Images", the disclosure of which is incorporated herein by reference in its entirety. Since the scanned image has already been degraded (blurred) to some extent by the scanner, the image processing steps corresponding to human visual perception, should utilize the DTF, rather than the VTF, in order to further transform the image to the point where it resembles what is perceived by the HVS.

Finally, various image analysis techniques can be applied to calculate specific image quality measures, such as graininess and line darkness, from the transformed image that is independent from the individual scanner used to obtain the digital image. For an example of such processing see co-pending U.S. Ser. No. 09/450,180 to Rasmussen et al., filed concurrently herewith. See also co-pending U.S. Ser. No. 09/450,177 to Rasmussen et al., filed concurrently herewith, entitled "Outline Font For Analytical Assessment of Printed Quality Text", the disclosure of which is incorporated herein in its entirety, relating to image quality analysis of text.

Figure 5:
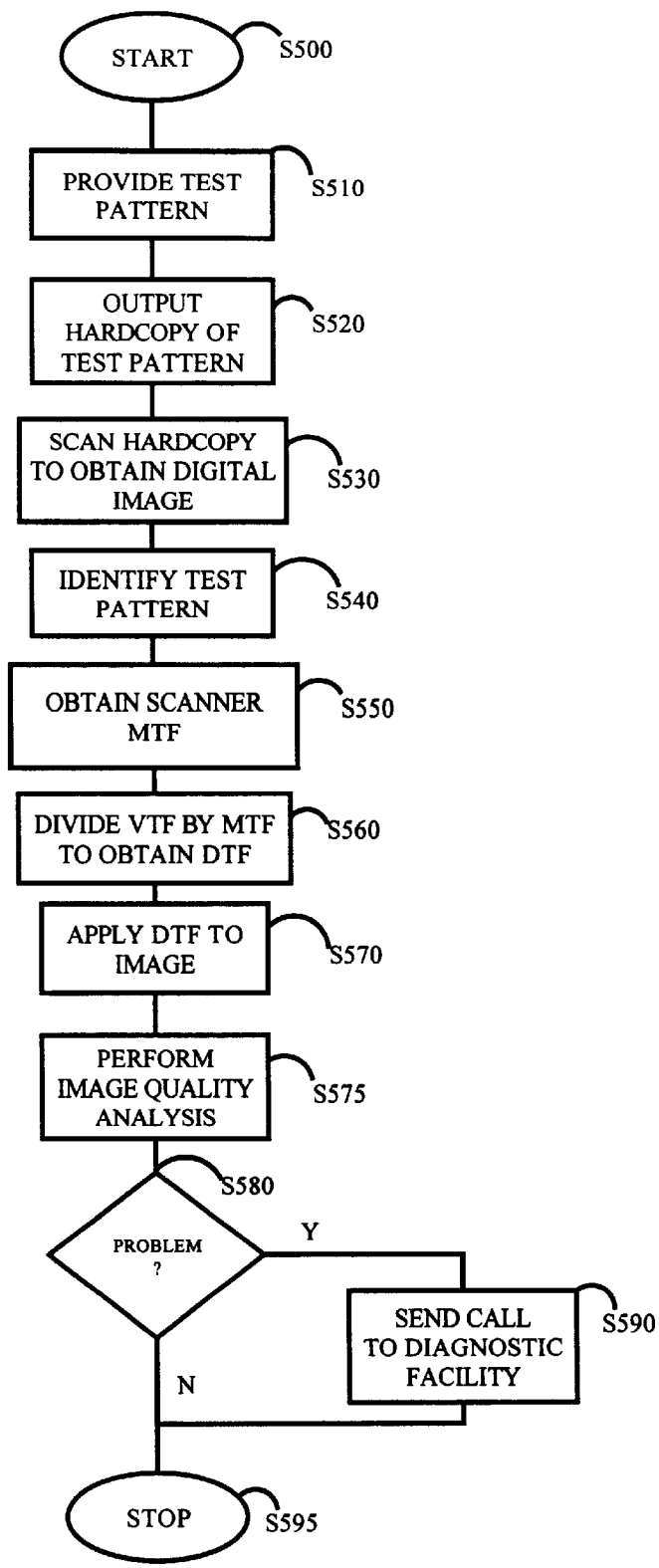
FIG. 5 is a flow chart showing a more detailed image analysis method according to the invention.

An exemplary method for performing consistent image quality analysis according to the invention will be described with reference to FIG. 5. Before this process can start, the MTF of the specific scanner must have been determined. This needs be done only once for the given scanner, and in the case where the scanner is part of the multifunction device that is being measured, the MTF of the scanner can be pre-determined by the manufacturer, and the results incorporated as a data file with the image quality analysis software. Alternatively, a special, characterized hardcopy test pattern, which is suitable for determination of scanner MTF, can be provided with the image quality analysis system, and one of the functions of the image quality analysis system can be to determine the MTF of the particular scanner used, based on a scan of this hardcopy test pattern. The resulting scanner MTF data can then be stored in a data file for subsequent use by the image quality analysis system with the specific scanner.

The process starts at step S500 and flow advances to step S510 where at least one specific test pattern, which can either be in hardcopy original form or a digital image stored in memory 36, is provided. Preferably, multiple different test patterns are used to analyze various components relevant to a determination of image quality. Flow then proceeds to step S520 where a corresponding hardcopy output of the test pattern is generated. This can be by outputting a printed hardcopy output from output station 26 using the digital test pattern as an input when the test pattern is stored in digital form, such as in hard disk 36 or floppy disk 38. Then, flow advances to step S530 where the hardcopy output is scanned by scanner 20 to form a digital raster image for analysis purposes. Each scanner has its own sensitivity and spatial resolution. After step S530, flow advances to step S540 where a particular test image is detected. Then, flow advances to step S550 where the pre-determined modulation transfer function (MTF) of the particular scanner being used is obtained. This transfer function helps to provide analysis that is device independent. It is also important for the subsequent image quality analysis to reflect characteristics of image quality that are perceivable by human viewers. Accordingly, a transform according to human visual perception is also applied to the image. Several human vision models are known from the literature, and all involve steps corresponding to application of a Visual Transfer Function (VTF) that blurs the image to some extent. From step S550, flow advances to step S560 where by dividing the VTF by the MTF, a differential transfer function (DTF) can be derived that reflects both the particular characteristics of the human visual system and the particular characteristics and resolving power of the scanner to provide a device independent compensation value. From step S560, flow advances to step S570 where the compensation function DTF is applied to the digital image from step S530 to achieve an image that corresponds to that perceived by a human viewer. Such an image is, as described above, largely device independent such that consistent comparisons can be made and generated regardless of the particular scanner used. From step S570, flow advances to step S575 where image quality analysis is performed on the compensated image.

At step S580, if the results of the image quality analysis indicate that a problem with image quality exists, flow may advance to step S590 where a service call can be made to a service facility. If no problem exists, flow advances from step S580 to step S595 where the process stops.

Figure 6:
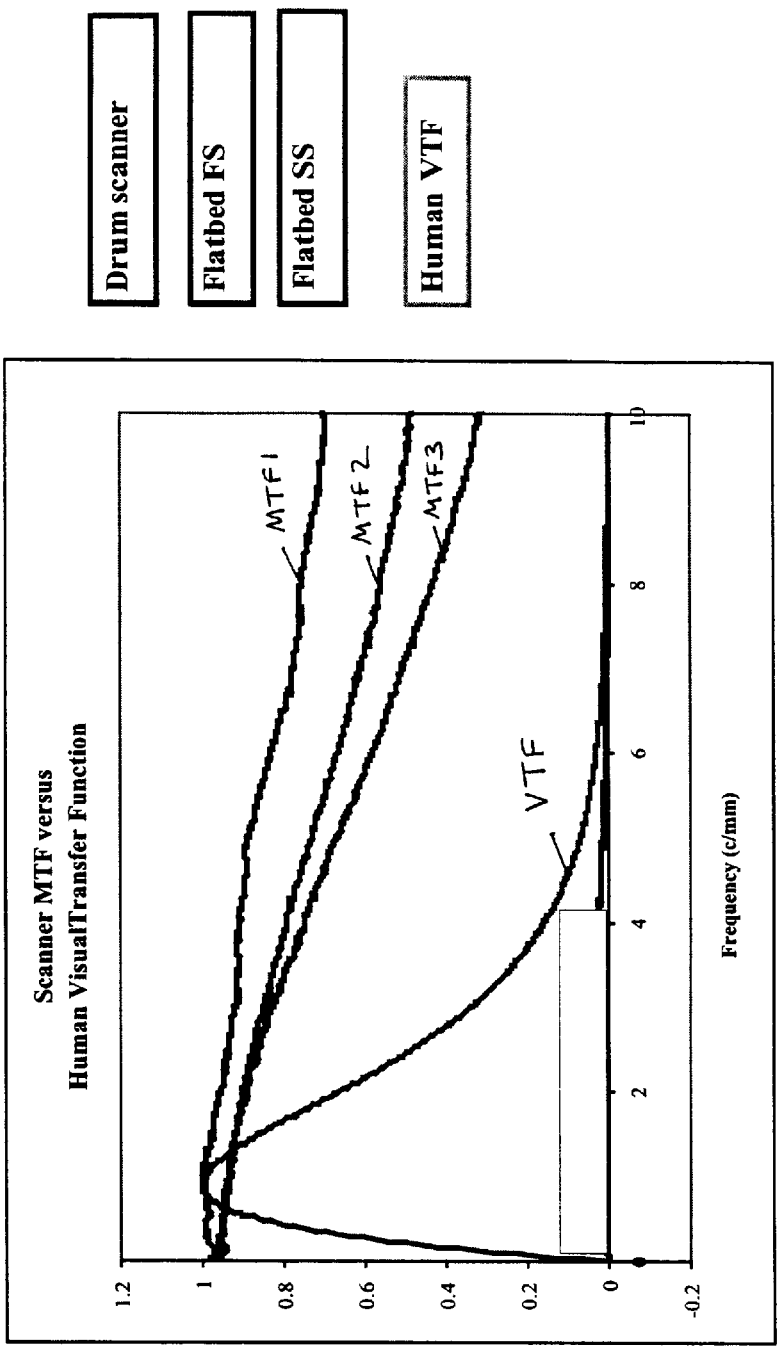
FIG. 6 shows examples of a human visual transfer function (VTF), as well as several MTF for different scanners.

The invention is useful in providing consistent image quality measurements regardless of the particular image input device used and its particular resolving powers. For example, as shown in FIG. 6, three different scanners are shown, each having differing MTFs (labeled MTF1, MTF2 and MTF3). Also shown is a human VTF. Even though the MTFs vary greatly from scanner to scanner, by using the inventive methods, a consistent image quality analysis can be performed regardless of which is used.

Figure 7:
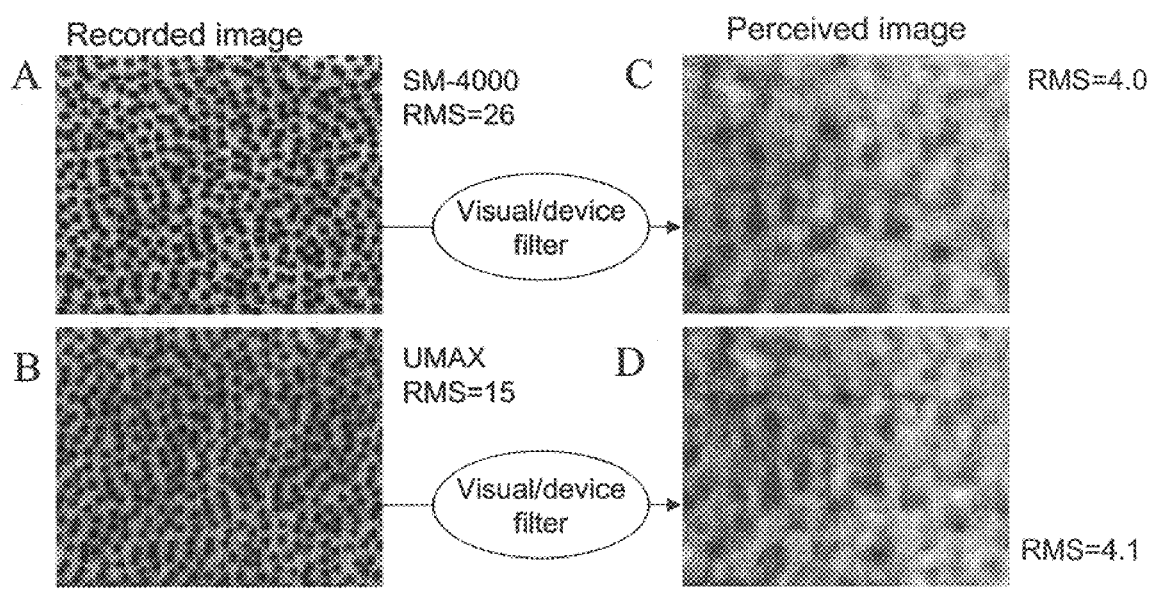
FIG. 7 shows applying a simple processing according to the invention to images scanned with two different devices.

FIG. 7 shows a simple processing according to the invention applied to images scanned from two different devices. Scanner SM-4000 and scanner UMAX were both used to scan a same printed halftone sample. The RMS of the pixel value deviation from the image average can be taken as a simple measure of uniformity, with a lower average being better. When this was applied directly to the scanned images, as in (A) and (B), the RMS values were 26 and 15, respectively. The large difference is caused by the significantly better resolving power of the SM-4000 device. However, when a filter that represents the residual between the human VTF and the device MTF is applied before RMS is calculated, as in (C) and (D), the agreement between the measurements using the two devices becomes excellent (4.0 versus 4.1).

Alternatively, two other methods could be used to avoid measurements that are affected by the resolving power of the instrument used to acquire the image data. However, neither of these alternatives are practical for one or more reasons. The first can be used when the scanning equipment includes high resolution scanning microdensitometers and CCD cameras. As these scanners have very high resolving powers (resolution), their MTF can be neglected for this type of application. Thus, DTF becomes equal to the VTF, and the IQ analysis module can simply use the VTF to obtain measurements that correlate with human visual perception. However, such instruments are very expensive and difficult to operate. As such, these types of scanners will not typically be used for routine image quality analysis outside dedicated image quality labs. While these instruments could be used in a stand-alone environment, such as that shown in FIG. 2, they would not be feasible for self-diagnosing multipurpose devices, such as copiers and facsimile machines as such scanners are cost-prohibited for such commercial products. As such, this alternative method is primarily limited in application.

The second alternative method may be useful when image scanning is performed by scanners with significant degradation caused by their particular MTF (i.e., not case 1 above). Many scanners can be "corrected" based on knowledge of the MTF. For example, typical flatbed scanner systems include options to sharpen the image in order to compensate for the loss of sharpness caused by the limitations in the MTF. However, such algorithms which compensate for the MTF and try to reestablish the image as it would have been recorded by a perfect scanning device are prone to generate artifacts in the image. These artifacts may significantly impact the results of the IQ analysis. As such, this alternative also has its disadvantages and is not suitable for the purposes discussed here.

With the present invention, relatively inexpensive image scanning devices can be used for the image quality analysis, despite their limitations and differences in terms of MTF. In particular, scanners that are part of a multi-function printer/scanner/copier can be used, and yet provide consistent IQ measurements. The image processing required to apply the DTF can be performed without introduction of artifact, since it does not attempt to directly correct for the MTF of the scanner, but essentially only blurs the image further, to the point where it resembles the visually perceived image.

Several straight-forward extensions and/or modifications of the invention are possible, including:

1. In addition to the correction for spatial resolving power of the devices, a color calibration can be applied. This is further described in co-pending U.S. Ser. No. 09/450,185 to Rasmussen et al., filed concurrently herewith, entitled "Virtual Tech Rep By Remote Image Quality Analysis".

2. The invention has been described mainly in terms of frequency-domain characterization of scanner and human visual perception, that is, in term of MTF and VTF which provide sensitivity at different spatial frequencies. However, the actual processing of images is often better done using real-space convolution kernels, which correspond to the frequency-space MTF or VTF. Therefore, the invention could equivalently have been described in terms of convolution kernels. The critical point is that, when the image is processed (whether in frequency—or real-space) to represent the humanly perceived image, the scanner resolving power characteristics are factored out.

What is claimed is:

1. An image quality analysis system for an image output device that is input device independent, comprising:
   a test pattern pertinent to image quality determination;
   a scanner that scans a hardcopy test image, which has been generated by the output device based on the test pattern, to form a digital raster image, the scanner having a predetermined modulated transfer function (MTF);
   means for blurring the digital raster image by a differential transfer function (DTF) corresponding to the modulation transfer function (MTF) divided by the visual transfer function (VTF) corresponding to a human visual system to form a blurred image; and
   an image quality analysis module that receives the blurred image, distinguishes one or more test targets from the blurred image, and performs image quality analysis on the test targets to obtain results quantifying image quality,
   wherein the results of the image quality analysis are scanner independent and the blurred image from which the image analysis was conducted corresponds to an image perceived by a human viewer when viewing the hardcopy test image.

2. The image quality analysis system of claim 1, wherein the image quality analysis module resides locally at a site of the image output device.

3. The image quality analysis system of claim 2, wherein the image output device is a copier that contains the scanner.

4. The image quality analysis system of claim 1, wherein the scanner and the image quality analysis module reside remote from the image output device.

5. The image quality analysis system of claim 1, wherein the test pattern is stored in memory at the image output device.

6. The image quality analysis system of claim 1, wherein the image output device is a copier having an input scanner section serving as the scanner and an output printer section, and the test pattern is in the form of a hardcopy printout that is subsequently scanned into the input scanner section and output as the hardcopy test image.

7. The image quality analysis system of claim 6, further comprising a communication module that connects the image quality analysis module to a remote facility.

8. The image quality analysis system of claim 7, wherein the results of the image quality analysis are forwarded to the remote facility through the communication module.

9. The image quality analysis system of claim 8, wherein the remote facility includes a diagnostic module that returns information pertinent to correcting any undesirable image quality test results.

10. A method of performing image quality analysis on an image output device having an output station that generates a hardcopy image from a digital image, the method comprising:

generating a hardcopy test image from the image output device based on a predetermined test pattern pertinent to image quality determination;

scanning the hardcopy test image using a scanner to form a digital raster image;

determining a Modulation Transfer Function (MTF) for the scanner at different spatial frequencies;

determining a Visual Transfer Function (VTF) to take into account the sensitivity of a human visual system (HVS);

calculating a Differential Transfer Function (DTF) at each spatial frequency reflecting the difference between MTF and VTF;

transforming the scanned digital test image according to the DTF to degrade or blur the image to some extent from that achieved by the scanner such that this blurred image represents the image perceived by the human vision system (HVS); and performing the image quality analysis based on the blurred image.

11. The method of claim 10, wherein the results of the image quality analysis are scanner independent and the blurred image from which the image analysis was conducted corresponds to an image perceived by a human viewer when viewing the hardcopy test image.

12. The method of claim 10, further comprising a step of sending a communication to a service facility indicating the results of the image quality analysis.

13. The method of claim 10, wherein the communication is a service call if the image quality results are less than desirable.

14. The method of claim 10, further comprising the steps of analyzing the results along with predetermined image output device operating parameters and communicating information to the image output device relevant to correcting the undesirable image quality.

15. The method of claim 10, wherein the image output device is a copier that contains the scanner.

16. The method of claim 10, wherein the method is automatically initiated by the copier at a predetermined time.

17. The method of claim 10, wherein the steps of scanning and analyzing are performed remote from the image output device.

18. A multi-function output device, including a scanner, and an associated data file provided on a storage medium that defines pre-determined data, usable to transform images scanned by the device into device-independent images that represent how the scanned sample would be perceived by a human observer, the data defining a single transform representing a Differential Transfer Function (DTF) that reflects a difference between a Modulation Transfer Function (MTF) that takes into account the scanner resolving power of the scanner and a Visual Transfer Function (VTF) that takes into account the sensitivity of a Human Visual System (HVS).

19. The multi-function output device of claim 18, where the data is in the form of space-domain convolution kernels.

* * * * *